(12) United States Patent
Liardet et al.

(10) Patent No.: US 7,764,786 B2
(45) Date of Patent: Jul. 27, 2010

(54) PROTECTION OF A DES ALGORITHM

(75) Inventors: Pierre-Yvan Liardet, Peynier (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 1135 days.

(21) Appl. No.: 11/227,826

(22) Filed: Sep. 15, 2005

(65) Prior Publication Data

US 2006/0056622 A1 Mar. 16, 2006

(30) Foreign Application Priority Data

Sep. 15, 2004 (FR) .................................. 04 52063

(51) Int. Cl.
H04K 1/00 (2006.01)
H04K 9/28 (2006.01)
H04L 9/00 (2006.01)
(52) U.S. Cl. ......................................... 380/28; 713/189
(58) Field of Classification Search .................. 380/29, 380/277, 28; 235/492, 487; 723/189; 713/189
See application file for complete search history.

(56) References Cited

U.S. PATENT DOCUMENTS

| 4,543,646 | A | * | 9/1985 | Ambrosius et al. | ............ | 380/29 |
|---|---|---|---|---|---|---|
| 6,278,783 | B1 | * | 8/2001 | Kocher et al. | ............... | 380/277 |
| 6,820,814 | B1 | * | 11/2004 | Benoit | ......................... | 235/487 |
| 7,219,844 | B2 | * | 5/2007 | Dischamp | .................... | 235/492 |
| 2001/0053220 | A1 | * | 12/2001 | Kocher et al. | ................. | 380/29 |
| 2003/0044003 | A1 | * | 3/2003 | Chari et al. | .................... | 380/28 |
| 2004/0030905 | A1 | * | 2/2004 | Chow et al. | ................. | 713/189 |

FOREIGN PATENT DOCUMENTS

| EP | 1 109 350 A1 | 6/2001 |
|---|---|---|
| EP | 1 263 163 A1 | 4/2002 |

OTHER PUBLICATIONS

French Search Report from corresponding French Application No. 04 52063, filed Sep. 15, 2004.

* cited by examiner

*Primary Examiner*—Kambiz Zand
*Assistant Examiner*—Monjour Rahim
(74) *Attorney, Agent, or Firm*—Lisa K. Jorgenson; James H. Morris; Wolf, Greenfield & Sacks, P.C.

(57) ABSTRACT

A method for protecting the execution of an algorithmic calculation taking into account at least one valid piece of data and at least one secret key by an integrated circuit, and performing several iterations of an encryption calculation, including executing the algorithm with the valid data between several executions of the same algorithm with invalid data corresponding to a combination of the valid data with predetermined masks.

18 Claims, 1 Drawing Sheet

PROTECTION OF A DES ALGORITHM

BACKGROUND OF THE INVENTION

1. Field of the Invention

The present invention relates to the field of encryption algorithms, in particular of DES type (Data Encryption Standard), executed by integrated circuits. The present invention more specifically relates to the protection of the execution of a DES algorithm against a differential power analysis (DPA) attack of the circuit which executes the algorithm.

2. Discussion of the Related Art

DES or triple DES algorithms are symmetrical encryption algorithms (with a secret key) used in cryptography, for example, to encrypt data before having them transited on unprotected supports (Internet, connection between a smart card and a card reader, between a processor and an external memory, etc.). Such algorithms are described, for example, in standards FIPS PUB 46-2 (DES) and FIPS PUB 46-1, and operating modes (known as Electronic Codebook—ECB, Cipher Block Chaining—CBC, Cipher Feedback—CFB, Output Feedback—OFB) are described in FIPS PUB 81.

These algorithms perform an encryption by blocks (of 64 bits) by using keys (of 64 bits for the DES and of 128 bits for the triple DES) from which are derived sub-keys of 48 bits. The decryption is performed based on the same key (symmetrical algorithm). In the following description, the DES algorithm will be taken as an example.

A block to be encrypted designated as M is submitted to an initial permutation, designated as IP, then to sixteen iterations of a calculation depending on a key, designated as KEY, and finally to a permutation inverse to the initial permutation, designated as $IP^{-1}$.

The calculation depending on key KEY can be expressed with the following notations:

i for the rank of the iteration ranging between 1 and 16;

$L_i R_i$ for a 64-bit data block, resulting from the application of function f to a block $R_{i-1}$ with sub-key $K_i$, formed of a word or sub-block $L_i$ of the 32 left-hand bits $b_1$ to $b_{32}$ and of a word or sub-block $R_i$ of the 32 right-hand bits $b_{33}$ to $b_{64}$;

$K_i$ for a 48-bit block extracted from 64-bit key KEY and used in the encryption function of rank i; and f for an encryption function.

With the above notations, the result of the initial permutation IP is a block $L_0 R_0$ and each iteration applies:

$L_i = R_{i-1}$; and $R_i = L_{i-1}(+) f(R_{i-1}, K_i)$, where (+) designates a bit-to-bit addition modulo 2 (bit-to-bit XOR).

The result of the last iteration is a block $R_{16} L_{16}$ which is submitted to the inverse permutation $IP^{-1}$ to provide an encrypted block designated as M'.

Function f comprises three successive steps.

A first step is an expansion, designated as E, of the 32 bits of sub-block $R_{i-1}$ in 48 bits to combine them, by a bit-to-bit XOR function (+), with the 48 bits of sub-key $K_i$ of the concerned iteration. The result of this expansion and combination provides eight groups of six bits, designated as $B_{1i}$ to $B_{8i}$, such that:

$$B_{1i} B_{2i} B_{3i} B_{4i} B_{5i} B_{6i} B_{7i} B_{8i} = K_i(+)E(R_{i-1}).$$

A second step applies to the 48 bits provided by the previous step a substitution table, designated as S or SBOX. In this step, each group of six bits resulting from the previous expansion is transformed, by one of eight substitution functions (primitive functions), noted $S_1$ to $S_8$, substituting each group $B_{1i}$ to $B_{8i}$ with a group $S_1(B_{1i})$ to $S_8(B_{8i})$, each over 4 bits, to obtain eight groups of four bits, or again 32 bits. The result can be noted $S_1(B_{1i}) S_2(B_{2i}) S_3(B_{3i}) \ldots S_8(B_{8i})$, substitution functions $S_1$ to $S_8$ being independent from the rank of the iteration.

A third step is a permutation, noted P, of the 32 bits resulting from the previous step. This permutation provides a 32-bit result sub-block corresponding to the result of function f and that may be expressed as:

$$f(R_{i-1}, K_i) = P(S_1(B_{1i}) S_2(B_{2i}) S_3(B_{3i}) \ldots S_8(B_{8i})).$$

Each sub-key $K_i$ is obtained by applying a key function KS which is a function specific to key KEY, function KS depending on rank i of the iteration, that is:

$$K_i = KS(i, KEY).$$

The details of primitive functions KS, $S_1$ to $S_8$ and P, as well as of functions E are described in the mentioned standards.

The encryption is performed by submitting a block to be decrypted M' to initial permutation IP, then to 16 calculation iterations identical to those of the encryption, with the only difference that the sub-keys are used in an inverse order (it is started from sub-key $K_{16}$ to end with sub-key $K_1$). The first block resulting from the inverse permutation is block $R_{16} L_{16}$ and the block resulting from the last iteration to be submitted to inverse initial permutation $IP^{-1}$ is block $L_0 R_0$. Permutation $IP^{-1}$ provides decrypted block M.

A weakness of DES-type algorithms appears in attacks by differential power analysis of a circuit executing the algorithm. Such attacks consist of making assumptions about the key to correlate an intermediary result during the iterations to the power consumption of the integrated circuit. Such attacks enable discovering the secret formed by the key. Indeed, function f is known (DES standard), as well as the input data applied to the algorithm. Supposing a portion of sub-key K by assumption, an intermediary result $L_i R_i$ is obtained. If a correlation between the intermediary result and the circuit consumption is obtained at a time t, the assumption as to the key is verified. Computing means enables the hackers to make assumptions in a sufficient number, and thus to hack the secret of the circuit (the key).

A first known solution to attempt to protect a secret handled by a DES algorithm is to mask the execution by introduction of random numbers in the iterations. This solution has the disadvantage of requiring a modification of the actual algorithm and is thus not applicable to circuits in which the DES execution cell already exists in non-reconfigurable wired logic. Indeed, for rapidity reasons, the algorithm is generally executed, at least partially, by a cell in wired logic integrated to the circuit using the data. The key is generally stored in a secure circuit area, for example, in an integrated circuit personalization phase. Its loading into the cell of execution of the algorithm is performed in protected fashion, for example, by applying the methods described in patents FR-A-2802668 and FR-A-2802669, which are incorporated herein by reference.

A second known solution consists of masking the execution of the algorithm with the secret key by having it execute among several executions (some ten) using false keys. These keys are permanently stored in a non-volatile memory associated with the algorithm execution processor or directly hardwired in the circuit. The right key is generally written on personalization of the circuit (for example, of the smart card) by a person different from the circuit manufacturer, in a generally inaccessible area (secure area of the circuit). Thus, a hacker cannot know, when an assumption about a key is verified, whether the right key has been used or not. A disadvantage of this solution is that, to preserve the masking, it is necessary to protect all the keys (the false ones as well as the right one) in their loading into the algorithm execution cell. This takes time and lengthens, in a manner incompatible with the desired fast data manipulation, the algorithm execution. Another disadvantage of this solution is that it only brings white noise, which is thus easily filterable by the hacker.

SUMMARY OF THE INVENTION

The present invention aims at improving the security of encryption algorithms, in particular, of DES type, against differential power analysis attacks of an integrated circuit which executes this algorithm.

The present invention especially aims at providing a solution compatible with the desired rapidity for the data encryptions and decryptions.

The present invention also aims at providing a solution which does not require modifying the actual algorithm and which is thus compatible with cells of conventional execution of the DES algorithm.

To achieve these and other objects, the present invention provides a method for protecting the execution of an algorithmic calculation taking into account at least one valid piece of data and at least one secret key by an integrated circuit, and performing several iterations of an encryption calculation, comprising executing the algorithm with the valid data between several executions of the same algorithm with invalid data corresponding to a combination of the valid data with predetermined masks.

According to an embodiment of the present invention, the position of the execution with the valid data in the general execution is randomly selected.

According to an embodiment of the present invention, said combination is, for each masked execution, a bit-to-bit addition of the bits of a block of the valid data with the mask bits.

According to an embodiment of the present invention, the execution with the valid data corresponds to a combination with a neutral mask for the combination operation.

According to an embodiment of the present invention, said predetermined masks are selected so that the result of the application of the algorithm with the same key is different for at least one bit from the result of the application of the algorithm to the valid data.

According to an embodiment of the present invention, the algorithm is the DES algorithm, the combination taking place before execution of the first iteration.

According to an embodiment of the present invention, the masks are 64-bit blocks to be combined with the 64-bit blocks of the valid data before application of an encryption iteration, the 64-bit block of each mask comprising among the bits of positions $b_7$, $b_{57}$, $b_{49}$, $b_{41}$, $b_{33}$, and $b_{25}$, between 1 and 6 bits at state 1, the bits of all other positions being at state 0.

The present invention also provides a processor of execution of a DES-type encryption algorithm or the like.

The foregoing and other objects, features, and advantages of the present invention will be discussed in detail in the following non-limiting description of specific embodiments.

DETAILED DESCRIPTION

Figure 1:
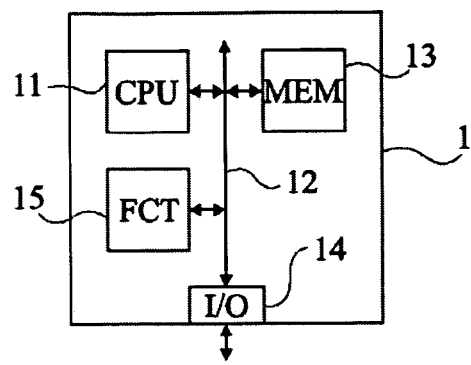
FIG. 1 represents, very schematically, an example of an integrated processor to which applies the present invention.

For clarity, only those steps and elements which are necessary to the understanding of the present invention have been shown in the drawings and will be described hereafter. In particular, the forming of a calculation processor for the implementation of the present invention has not been described in detail, the present invention being implementable with any conventional processor, by providing the adapted data thereto.

A feature of the present invention is to mask the execution of the encryption algorithm by executing this algorithm several times with false data, thus masking the encryption of the "right" data. The right data to be encrypted introduced into the algorithm processing cell are combined with masks, preferably predetermined, to create false data on which the encryption algorithm is applied. The execution of the algorithm with the unmasked introduced data is interposed, preferably at a random position, in the series of masked executions. Preferably, all encryptions are performed with the same key which is thus transferred only once into the algorithm processing cell.

The masks are in fact data blocks of same size as the data blocks processed by the algorithm at the step selected for the combination, which are combined, preferably, by an XOR type function (bit-to-bit addition) with the data block to be encrypted. Preferably, the masks are selected according to the algorithm for the result of the application of the algorithm with the same key to be different for at least one bit from the result of the application of the algorithm to the valid data.

Accordingly, a hacker introducing data that he knows and making assumptions about the key is incapable of obtaining a proper correlation with the integrated circuit power consumption since this power consumption is a function of different data.

The present invention will be described hereafter in relation with a preferred embodiment with the DES algorithm. It however more generally applies to any encryption algorithm, provided that the creation of the masks to create false data by modification of a message to be encrypted can be adapted.

Preferably, the masks manipulated by the algorithm which are used to introduce false correlations over the channel (mask the execution) are prerecorded in the integrated circuit containing the cell.

An advantage of executing the algorithm with several data rather than with several keys is that the data need not be masked for the introduction into the cell. The protection then only negligibly slows down the encryption or decryption of the introduced data with respect to the conventional solution using several keys.

The present invention takes advantage from the fact that, in any encryption algorithm and especially in the DES algorithm, the progress of the calculation results in that successive values can be predicted by making assumptions about the key. The false messages (masked data) coming up from the beginning result in that these assumptions are seen as relative to a false key. In the DES algorithm, at each time of the calculation where the key appears in the form of a sub-key with the message, the data and the sub-key are then linked by a function arbitrarily designated as g to provide an intermediary result arbitrarily designated as I, which is such that I=g(KEY, D). A power analysis attack consists of attempting to correlate results I with the consumption by making assumptions about key KEY. Knowing data D that it introduces, and knowing function g (the DES algorithm is known), the hacker calculates a result I based on an assumption about key KEY. If the correlation between value I and the circuit power consumption is verified, this means that the assumption about the key was the right one.

The fact of executing the algorithm on false data results in that the hacker obtains a correlation on modified data D'. As a result, the correlation appears on a key assumption which is not the right one. In other words, the hacker believes that the algorithm executes function I=g(KEY, D) while it eventually executes I'=g(KEY, D'), with D'=D(+)A, where A designates the mask providing result I'. The hacker believes he knows the data (that he has introduced) and thus makes assumptions as to the key, based on power analyses. This power consumption is however altered without him knowing it.

In fact, by combining the input data with a mask, the present invention indirectly masks the key by taking into account the fact that the possible attacker makes assumptions as to this key.

When the result provided by the circuit is altered, the "right" execution must be randomly interposed among a few masked executions (the number of masked executions is selected according to the time available for the algorithm execution). This is especially necessary to properly operate the circuit in the absence of piracy (the right encryption must be providable in a normal execution). This proper result is provided in a result area different from that in which the false executions can be found.

Preferably, the execution with the valid data actually corresponds to a combination with a neutral mask as to the combination. Thus, no difference is detectable between executions. The only reference to be temporarily stored to identify the execution with the valid data is its position in all the executions, which preferably corresponds to the result of a random drawing.

Figure 2:
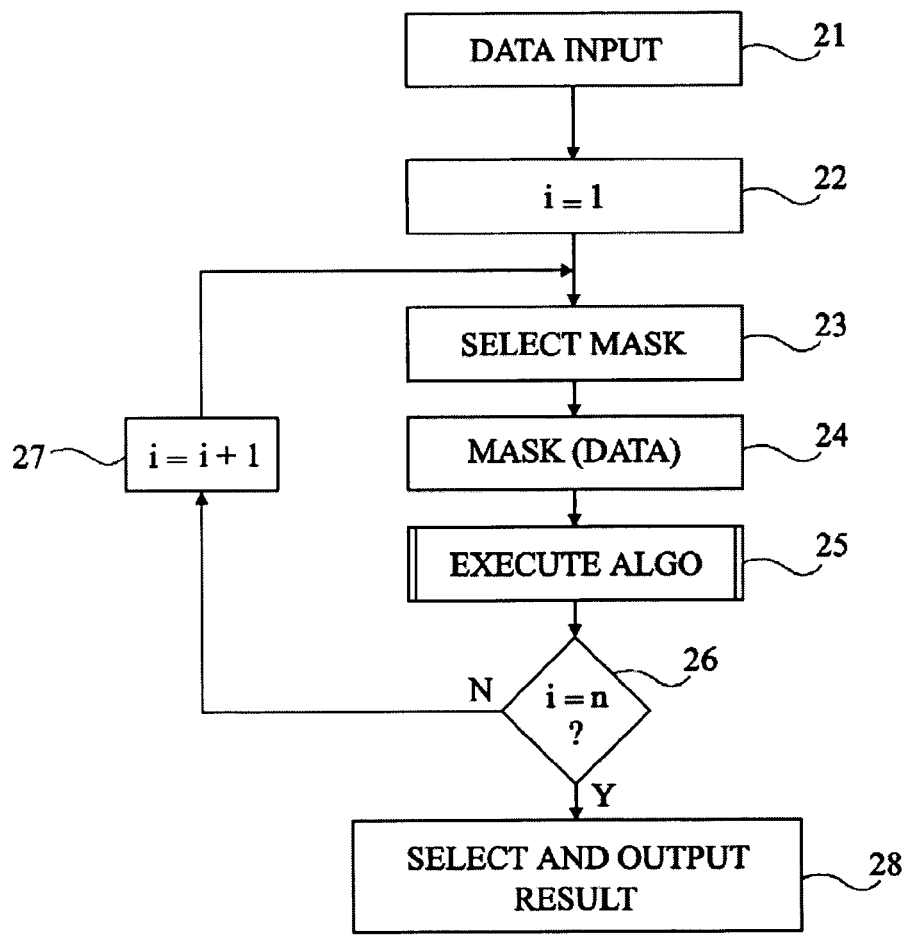
FIG. 2 is a flowchart of an embodiment of the method according to the present invention.

FIG. 1 represents, very schematically, an example of processor 1 for implementing the method according to the present invention. Such a processor comprises a central processing unit 11 (CPU) able to communicate, through one or several buses 12 for data, addresses and control signals, with one or several memories 13 (MEM) and with an input/output interface circuit 14 (I/O) for communicating with outside. Other integrated elements 15 (FCT) implementing other functions (among which, for example, a dedicated circuit for performing the algorithm the execution of which is to be protected) are connected to the bus(es) 12 depending on the application FIG. 2 is a simplified flowchart of an embodiment of the method according to the present invention implemented, for example, by a processor as represented in FIG. 1. Data to be processed (block 21, DATA INPUT) are received by the processor 1. In this example, a loop of n executions of the algorithm ALGO is initialized (block 22, i=1). For each iteration of the loop, a mask to be applied to the data is selected (block 23, SELECT MASK). Such a selection is, for example, randomized and the rank of the right execution (with a neutral mask) is stored. The selected mask is applied to the data (block 24, MASK(DATA)) and the algorithm is executed with the masked data (block 25, EXECUTE ALGO). The algorithm can be executed by the central processing unit 11 (software implementation) and/or by a dedicated circuit 15 (hardware implementation) and the results of the computations are for example stored in the memory 13. While the loop is not ended (output N of block 26 (i=n ?)), another iteration (block 27, i=i+1) is performed with another mask. When the n iterations have been made (output Y of block 26), the result of the right execution (masked with a neutral mask) is selected and outputted (block 28, SELECT AND OUTPUT RESULT).

In the context of the DES algorithm and according to this preferred embodiment, masks or masking data are stored, for example, in a non-volatile memory area, in the integrated circuit.

The mask construction function is a function of the algorithm and must be such that for any message D likely to be selected by the attacker and for any key K (right) or K' (false), operation g (bit-to-bit addition in the DES case) of combination of first sub-key $K_1$ or $K_1'$ with an intermediary result designated as I (I=E($R_0$) in the DES case) which is a function of the input data before application of the first sub-key, is such that:

g(I, $K_1'$)=g(I', $K_1$), where I' designates the intermediary result obtained with the masked data.

The masks are however constructed independently from the data D with which they are likely to be combined, these data being however unknown.

For the DES algorithm, when the bits of the initial message are considered, it can be seen that certain bit positions (determined by IP and E) are combined with the key bits, for example, bits 1, 2, 3, 4, 5, and 6 of sub-key $K_1$ are combined by XOR (+) with bits $b_7$, $b_{57}$, $b_{49}$, $b_{41}$, $b_{33}$, and $b_{25}$ of the introduced data block D. Thus, a masking by combination of six bits $m_1$, $m_2$, $m_3$, $m_4$, $m_5$, and $m_6$ with bits $b_7$, $b_{57}$, $b_{49}$, $b_{41}$, $b_{33}$, and $b_{25}$ of the data message provides a new message which, once applied to the input of the encryption cell, achieves the same result at the end of the step of combination with the sub-key. Thus, the hacker which calculates the correlation between the data processed by the algorithm in the first round under the assumption corresponding to the right key, obtains no correlation, while under the assumption of a false key, he will see a correlation between the predicted key (its assumption) and the effectively-calculated data.

For the manipulation of false data not to be locatable, the mask (which can be considered as a predetermined data block—the six masking bits at positions $b_7$, $b_{57}$, $b_{49}$, $b_{41}$, $b_{33}$, and $b_{25}$) must be introduced at the cell input.

According to a preferred embodiment, any combination of states 0 and 1 is selected for the six bits $b_7$, $b_{57}$, $b_{49}$, $b_{41}$, $b_{33}$, and $b_{25}$ of the masking data block (one combination from among the 64 possible combinations) and all its other bits are set to state 0 (neutral element of the addition), so that the bits of the real data message, other than bits $b_7$, $b_{57}$, $b_{49}$, $b_{41}$, $b_{33}$, and $b_{25}$, are not modified by the mask. As an alternative, the other block bits will be randomly set. This alternative is however not preferred since its risks introducing a white noise.

The above preferred embodiment takes into account the fact that, in the DES algorithm, the application of first substitution S (SBOX) only affects bits $b_7$, $b_{57}$, $b_{49}$, $b_{41}$, $b_{33}$, and $b_{25}$ of the data block. Indeed, by representing the 64-bit data blocks in the form of matrixes of eight words of eight bits and, with the above notations, the input data block can be written as:

$b_1$, $b_2$, $b_3$, $b_4$, $b_5$, $b_6$, $b_7$, $b_8$;
$b_9$, $b_{10}$, $b_{11}$, $b_{12}$, $b_{13}$, $b_{14}$, $b_{15}$, $b_{16}$;
$b_{17}$, $b_{18}$, $b_{19}$, $b_{20}$, $b_{21}$, $b_{22}$, $b_{23}$, $b_{24}$;
$b_{25}$, $b_{26}$, $b_{27}$, $b_{28}$, $b_{29}$, $b_{30}$, $b_{31}$, $b_{32}$;
$b_{33}$, $b_{34}$, $b_{35}$, $b_{36}$, $b_{37}$, $b_{38}$, $b_{39}$, $b_{40}$;
$b_{41}$, $b_{42}$, $b_{43}$, $b_{44}$, $b_{45}$, $b_{46}$, $b_{47}$, $b_{48}$;
$b_{49}$, $b_{50}$, $b_{51}$, $b_{52}$, $b_{53}$, $b_{54}$, $b_{55}$, $b_{56}$;
$b_{57}$, $b_{58}$, $b_{59}$, $b_{60}$, $b_{61}$, $b_{62}$, $b_{63}$, $b_{64}$.

After application of initial permutation IP, this matrix becomes:

$b_{58}$, $b_{50}$, $b_{42}$, $b_{34}$, $b_{26}$, $b_{18}$, $b_{10}$, $b_2$;
$b_{60}$, $b_{52}$, $b_{44}$, $b_{36}$, $b_{28}$, $b_{20}$, $b_{12}$, $b_4$;
$b_{62}$, $b_{54}$, $b_{46}$, $b_{38}$, $b_{30}$, $b_{22}$, $b_{14}$, $b_6$;

$b_{64}, b_{56}, b_{48}, b_{40}, b_{32}, b_{24}, b_{16}, b_8$;
$b_{57}, b_{49}, b_{41}, b_{33}, b_{25}, b_{17}, b_9, b_1$;
$b_{59}, b_{51}, b_{43}, b_{35}, b_{27}, b_{19}, b_{11}, b_3$;
$b_{61}, b_{53}, b_{45}, b_{37}, b_{29}, b_{21}, b_{13}, b_5$;
$b_{63}, b_{55}, b_{47}, b_{39}, b_{31}, b_{23}, b_{15}, b_7$.

When the left-hand and right-hand portions are submitted to the first round, only the right-hand portion:

$b_{57}, b_{49}, b_{41}, b_{33}, b_{25}, b_{17}, b_9, b_1$;
$b_{59}, b_{51}, b_{43}, b_{35}, b_{27}, b_{19}, b_{11}, b_3$;
$b_{61}, b_{53}, b_{45}, b_{37}, b_{29}, b_{21}, b_{13}, b_5$;
$b_{63}, b_{55}, b_{47}, b_{39}, b_{31}, b_{23}, b_{15}, b_7$, is modified and becomes:

$b_7, b_{57}, b_{49}, b_{41}, b_{33}, b_{25}, b_{17}$;
$b_{25}, b_{17}, b_9, \ldots$;
$\ldots$;
$\ldots b_{15}, b_7, b_{57}$.

At the end of expansion step E, eight words of six bits each are obtained, which have the following expression:

$b_{32}, b_1, b_2, b_3, b_4, b_5$;
$b_4, b_5, b_6, b_7, b_8, b_9$;
$b_8, b_9, b_{10}, b_{11}, b_{12}, b_{13}$;
$b_{12}, b_{13}, b_{14}, b_{15}, b_{16}, b_{17}$;
$b_{16}, b_{17}, b_{18}, b_{19}, b_{20}, b_{21}$;
$b_{20}, b_{21}, b_{22}, b_{23}, b_{24}, b_{25}$;
$b_{24}, b_{25}, b_{26}, b_{27}, b_{28}, b_{29}$;
$b_{28}, b_{29}, b_{30}, b_{31}, b_{32}, b_1$.

Thus, data D can be masked by being combined by XOR with a block having at least one of its bits $b_7, b_{57}, b_{49}, b_{41}, b_{33}$, and $b_{25}$ at 1 and all its other bits at 0. Any bit combination of bits $b_7, b_{57}, b_{49}, b_{41}, b_{33}$, and $b_{25}$ is valid provided that at least one of them has value one.

All the parts of data D are successively masked by applying the same mask to each 64-bit block introduced into the cell.

Of course, the present invention is likely to have various alterations, modifications, and improvements which will readily occur to those skilled in the art. In particular, although the present invention has been described in relation with a preferred embodiment of false data generation, its transposition to another generation function is within the abilities of those skilled in the art, respecting the condition that each portion on which the selection function of the DPA attack applies, that is, each six-bit portion at the beginning of the substitution steps, differs by at least one bit when it is masked.

Further, the practical forming of an algorithmic execution cell for the implementation of the present invention is within the abilities of those skilled in the art based on the functional indications given hereabove by using conventional programming tools.

Further, other functions of mask combination with the input data may be envisaged, provided to respect the above-described functionalities. The bit-to-bit addition is however preferred due to its simplicity.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting execution of an algorithm by a processor of an integrated circuit, the algorithm taking into account at least one valid piece of data stored in memory of the integrated circuit and at least one secret key, and performing several iterations of an encryption calculation, the method comprising:

executing, by the processor, the algorithm with the valid data stored in the memory between several executions of the same algorithm with false data, wherein the false data comprises a combination of the valid data with predetermined masks, and wherein a position of the execution of the algorithm with the valid data among the several executions of the same algorithm with the false data is randomly selected.

2. The method of claim 1, wherein said combination is, for each masked execution, a bit-to-bit addition of bits of a block of the valid data with bits of each mask of the predetermined masks.

3. The method of claim 1, wherein the execution with the valid data corresponds to a combination of the valid data with a neutral mask.

4. The method of claim 1, wherein said predetermined masks are selected so that a result of application of the algorithm with the same key is different for at least one bit from a result of application of the algorithm to the valid data.

5. The method of claim 1, wherein the algorithm is a data encryption standard (DES) algorithm, the combination operation taking place before execution of a first iteration.

6. The method of claim 5, wherein the predetermined masks are 64-bit blocks to be combined with the 64-bit blocks of the valid data before application of an encryption iteration, the 64-bit block of each mask of the predetermined masks comprising among bits of positions $b_7, b_{57}, b_{49}, b_{41}, b_{33}$, and $b_{25}$, between 1 and 6 bits at state 1, bits of all other positions being at state 0.

7. A processor for execution of an encryption algorithm, comprising means for protecting the execution of an algorithmic calculation of the encryption algorithm taking into account at least one valid piece of data and at least one secret key by an integrated circuit, the processor configured to:

perform a first plurality of iterations of an encryption calculation, comprising executing the encryption algorithm with the least one valid piece of data between a second plurality of iterations of the same encryption algorithm with false data, wherein the false data comprises a combination of the least one valid piece of data with at least one mask from predetermined masks, and wherein a position of the execution of the first plurality of iterations of the encryption algorithm with the least one valid piece of data among the second plurality of iterations of the encryption algorithm with the false data is randomly selected.

8. The method of claim 1, further comprising storing the predetermined masks in the memory.

9. The processor of claim 7, wherein a number of the first plurality of iterations is selected based on a time for the execution of the encryption algorithm.

10. The processor of claim 7, wherein the executing the encryption algorithm with the at least one valid piece of data comprises applying a neutral mask to the at least one valid piece of data.

11. The processor of claim 7, further configured to provide an intermediate result by applying a predetermined function to the false data and a portion of the at least one secret key.

12. The processor of claim 10, wherein at least the portion of the at least one secret key is concealed from outside the processor when the intermediate result is obtained as a result of an assumption about the false data and the portion of the at least one secret key.

13. A system comprising a processor for executing an encryption algorithm, the processor configured to perform steps of:

executing a plurality of iterations of the encryption algorithm, wherein a first plurality of iterations among the plurality of iterations comprises execution of the encryption algorithm with valid data using neural masks applied to the valid data;

applying at least one predetermined mask to the valid data to obtain false data; and selecting a second plurality of iterations among the plurality of iterations, the second plurality of iterations comprises execution of the encryption algorithm with the false data, wherein each iteration of the first plurality of iterations is randomly interposed among the second plurality of iterations.

14. The system of claim 13, wherein the processor is configured to perform a first iteration of the plurality of iterations comprising execution of the encryption algorithm with the false data.

15. The system of claim 13, wherein a number of the second plurality of iterations is selected based on a time available for the execution of the encryption algorithm.

16. The system of claim 13, wherein applying the neutral masks to the valid data and applying the at least one predetermined mask to the false data makes the execution of the encryption algorithm with the valid data indistinguishable from the execution of the encryption algorithm with the false data from outside the system.

17. The system of claim 13, wherein, for each iteration of the second plurality of iterations, applying the at least one predetermined mask comprises a bit-to-bit addition of bits of a block of the valid data with bits of the at least one predetermined mask.

18. The system of claim 13, wherein the encryption algorithm comprises a data encryption standard (DES) algorithm.

* * * * *